US005416320A

United States Patent [19]

North

[11] Patent Number: 5,416,320

[45] Date of Patent: May 16, 1995

[54] CHLORINATED HYDROCARBON SENSOR FOR CONE PENETROMETER

[75] Inventor: Mark H. North, San Diego, Calif.

[73] Assignee: The United States of America as represented by the Secretary of the Navy, Washington, D.C.

[21] Appl. No.: 77,575

[22] Filed: Jun. 8, 1993

[51] Int. Cl.[6] .......................... G21F 5/04; G21G 4/02; G01V 5/10

[52] U.S. Cl. .................................. 250/253; 250/493.1; 250/496.1; 250/497.1

[58] Field of Search .................. 250/493.1, 497.1, 253; 376/159, 157

[56] References Cited

U.S. PATENT DOCUMENTS

| | | | |
|---|---|---|---|
| 3,885,160 | 5/1975 | Dillingham . | |
| 4,055,763 | 10/1977 | Antkiw . | |
| 4,078,174 | 3/1978 | Goldman . | |
| 4,122,339 | 10/1978 | Smith, Jr. et al. . | |
| 4,137,452 | 1/1979 | Paap et al. . | |
| 4,169,979 | 10/1979 | Arnold et al. . | |
| 4,191,884 | 3/1980 | Scott . | |
| 4,200,789 | 4/1980 | Arnold et al. . | |
| 4,220,851 | 9/1980 | Whatley, Jr. . | |
| 4,232,220 | 11/1980 | Hertzog . | |
| 4,380,701 | 4/1983 | Smith, Jr. et al. . | |
| 4,661,701 | 4/1987 | Grau | 250/270 |
| 4,814,609 | 3/1989 | Wraight et al. | 250/270 |
| 4,829,191 | 5/1989 | Boyar et al. | 250/493.1 |
| 4,879,463 | 11/1989 | Wraight et al. . | |
| 5,086,224 | 2/1992 | Roscoe et al. | 250/270 |
| 5,128,882 | 7/1992 | Cooper et al. . | |

*Primary Examiner*—Constantine Hannaher
*Attorney, Agent, or Firm*—Harvey Fendelman; Peter A. Lipovsky; Eric J. Whitesell

[57] ABSTRACT

A chlorinated hydrocarbon sensor is substituted as a portion of a cone penetrometer. The sensor includes a titanium casing in which a cylindrical sleeve of beryllium alpha target material is fixed. A rod-shaped americium alpha particle source is disposed within the casing and is moved by an electromagnetic relay into an interacting state in which the beryllium sleeve encases the americium alpha particle source. The interfacing beryllium and americium emit high energy neutrons used to detect the chlorinated hydrocarbons. The emission takes place only when an electromagnetic relay is energized so that cessation of energy will cause a cessation of neutron generation. The rod-shaped alpha particle source will then be withdrawn from the cylindrical beryllium sleeve by a retracting spring. The generated neutrons interact with hydrogen and chlorine in the soil surrounding the sensor to produce characteristic gamma radiation that is detected and measured by a sodium iodide scintillation crystal. A photomultiplier tube amplifies the detected signals and the signals are then converted into electrical signals by a converter. A paraffin neutron radiation shield is disposed between the alpha particle source and the scintillation crystal to prevent high energy fast neutrons from reaching the crystal. A cylindrical cadmium shield is disposed between the tubular casing and the crystal to prevent scattered, thermalized neutrons from being detected by the crystal. The data acquired is sent to the surface and measured in real-time.

17 Claims, 1 Drawing Sheet

CHLORINATED HYDROCARBON SENSOR FOR CONE PENETROMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to sensing instruments and more particularly to instruments designed to sense the nature of underground constituents. In greater specificity, this invention relates to a sensor designed to detect chlorinated hydrocarbons and hence pollutants in underground formations.

2. Description of the Related Art

As man and woman have become increasingly conscious of the fragile nature of their environment, a focus has been made upon pollutants, where they exist, their real and potential effects, and how to be rid of those already in place. Such thoughts are relatively new to all of us.

At times in the history of the United States as well as in other countries crash efforts were undertaken in pursuit of what were then considered to be worthy goals. For example, in the former Soviet Union as well as prior Eastern bloc countries, rapid and radical efforts were made to transform these nations from relatively agrarian states into highly industrialized societies. A similar transformation occurred in the U.S. in the days of the Industrial Revolution. In many of these efforts the effects on the environment were either ignored or not addressed at all.

In other efforts, such as those of national defense, tremendous environmental catastrophes were permitted to occur and were simply considered a necessary expense. For example, in the nuclear armament industry of the U.S.A., the former Soviet Union, and other countries, tremendous compromises in the delicate balance of nature were allowed to be made. Even in non-nuclear defense industries, industrial by-products were often dumped on land, in the air or in the water.

Because of the recent turn in world events, industrialized nations have been able to turn away from their focus on national defense and instead concentrate on environmental considerations. Such is the case in the United States where tremendous sums are being spent and allocated to "clean up" the waste sites created in the past.

At both defense and privately held hazardous waste sites efforts are being made to quantify and map specific chemical contaminants. A method of doing this is by installing monitoring wells at the sites. The installation of the wells is a costly and slow process. In order to guide placement of such wells an in situ technique of determining specific contaminant levels is needed. Presently, chlorinated hydrocarbon ratios of contaminated soil are determined by digging up core samples of the soil and bringing these to a laboratory for analysis. Such a process is, of course, costly and time consuming.

The oil industry has devised a number of techniques for analyzing soil content. For example, devices have been designed that provide underground resistivity, formation porosity and formation density. Some of these oil-related sensors give off neutrons whose interaction with adjacent soil formations is sensed to determine the nature of the surrounding soil.

In one scheme neutrons are pulsed by way of a rotating member interfacing with a reacting stator. In another case, a neutron generator is simply switched on with the generator providing neutron output until its source has expired.

The nonswitchable neutron generators have been considered undesirable where controlled cessation of neutron generation is desired either to minimize personnel hazards or to prevent excess underground radiation. These devices are used after a bore hole has been drilled and may be part of what is known as the drill string or may be sent down independently. In either case, a relatively large and expensive drill hole is required.

As previously explained, the drilling of wells at hazardous waste sites can be costly and time consuming. In addition, the drilling of such wells creates the possibility of contaminant release through the drill hole itself.

A device known as a cone penetrometer has been used to measure ground hardness as well as the electrical sensitivity of the ground. Cone penetrometers are relatively small in diameter, varying from approximately one to two inches and are typically made up of 1 meter sections that are simply pushed into the ground one section at a time. Such cone penetrometers have been known to reach depths of approximately 150 feet. When the penetrometer is drawn from the ground, the ground fills in the hole made so that, for example, when used in a toxic waste dump minimal toxic emission will occur through the penetrometer's earth penetration point.

SUMMARY OF THE INVENTION

The invention is a chlorinated hydrocarbon pollution sensor that may be utilized with commercially available penetrometers. As earlier described, the cone penetrometers are simply pushed into the ground section by section. This technique does not require the expense of drilling operations and has the added benefit of back-filling when the penetrometer is withdrawn. Because of the nature of the penetrometer, that of a piercing rather than a drilling instrument, penetrometers typically are of small diameters. Utilizing a sensor with such an instrument requires that the sensor be of small dimension and of relative simplicity. The invention meets these criteria, and is substituted as a section or portion of a section of a cone penetrometer.

The invention comprises a tubular casing made of titanium. The titanium provides strength as well as permits permeation of sensing signals. Fixed within the titanium casing is a cylindrical sleeve of beryllium alpha target material. A rod-shaped americium alpha particle source is disposed within the casing and is moved by an electromagnetic relay into an interacting state in which the cylindrical beryllium sleeve encases the rod-shaped americium alpha particle source. The interfacing of the beryllium and americium causes the emission of high energy neutrons.

The emission takes place only when the electromagnetic relay is energized so that cessation of energy to the electromagnetic relay, caused either intentionally or unintentionally, will cause a cessation of neutron generation. In such a case, the rod-shaped alpha particle source will be withdrawn from the cylindrical beryllium sleeve by a retracting spring. In this sense neutron generation may be easily controlled by an operator and will cease should control of the sensor be lost.

The generated neutrons will interact primarily with any hydrogen or chlorine present in the soil surrounding the sensor. These interactions will produce characteristic gamma radiation that is subsequently detected and measured by a sodium iodide scintillation crystal made a part of the invention. The scintillation crystal is attached to a photomultiplier tube that amplifies the detected signals and the amplified signals are then converted into electrical signals by a converter. A paraffin neutron radiation shield is disposed between the americium alpha particle source and the scintillation crystal to prevent high energy fast neutrons from reaching the crystal. Further, a cylindrical cadmium shield is disposed between the tubular titanium casing and the scintillation crystal to prevent scattered, thermalized neutrons from being detected by the crystal.

The data acquired by the invention is sent through a shielded cable to the surface and measured in real-time. The hydrogen-chlorine ratio of the surrounding material is determined by measuring the ratio counts in two energy windows. These windows are 1–2 Mev for hydrogen and 3–8 Mev for chlorine. Such measurements will allow the quantification of any chlorinated hydrocarbons present within the vicinity of the sensor.

OBJECTS OF THE INVENTION

It is an object of this invention to provide a sensor for determining underground constituents.

Another object of this invention is to provide a sensor for determining underground constituents that does not require a well hole to be drilled and that does not permit toxins to be released upon withdrawal of the sensor from the ground.

Yet a further object of this invention is to provide a sensor for determining underground constituents that may be used with a cone penetrometer.

Still a further object of this invention is to provide a cone penetrometer sensor for determining underground constituents that is simple in operation, small in size, that may be operated upon command and that has a fail-safe feature in the event of loss.

Other objects, advantages and new features of the invention will become apparent from the following detailed description when considered in conjunction with the accompanied drawings

DESCRIPTION OF THE PREFERRED EMBODIMENT

Figures 1, 2, 3:
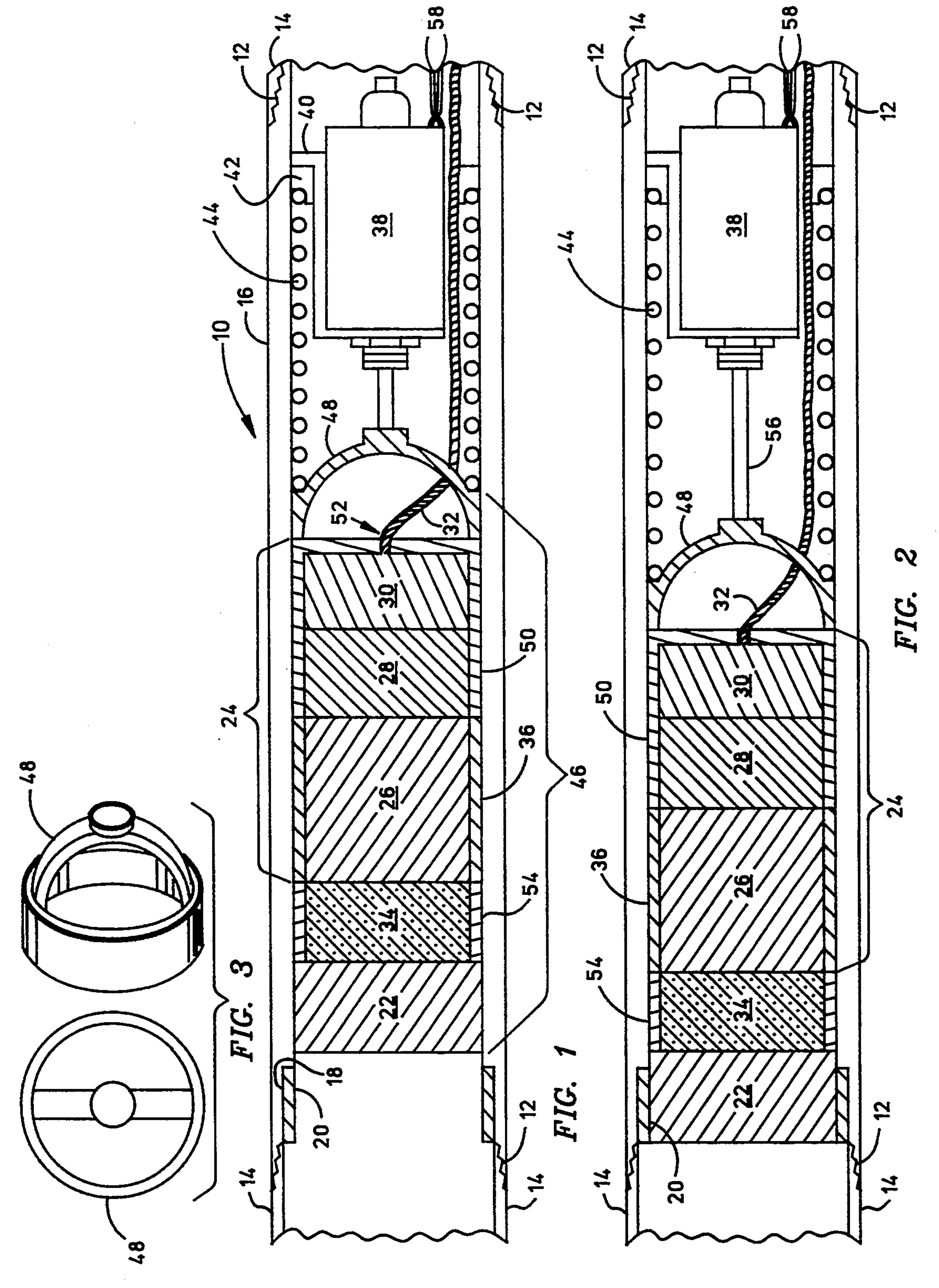
FIG. 1 illustrates a chlorinated hydrocarbon sensor of the invention as utilized with a typical cone penetrometer section. In this figure the sensor is in an inactive non-interacting state.
FIG. 2 depicts the chlorinated hydrocarbon sensor of the invention in an active, interacting state.
FIG. 3 illustrates a bridge beam as may be utilized in the invention.

Referring now to FIG. 1 there is shown a chlorinated hydrocarbon sensor 10 as may be incorporated with a commercially available cone penetrometer. Sensor 10 is made a part of a commercially available penetrometer and is incorporated as part of or joined to this penetrometer by conventional means such as threading 12. Penetrometer section 14 is typically approximately $1\frac{1}{2}$ to 2 inches in diameter. Section 14 as well as sensor 10 are pushed into the ground to a depth at which sensor readings are desired.

Sensor 10 includes a tubular casing 16 that is preferably made of titanium rather than the steel as steel will produce unacceptable background signals for the sensor. Casing 16 includes a bored or otherwise formed depression 18 in which a cylindrical sleeve 20 of alpha target material such as beryllium is fixed. Sensor 10 also includes a rod-shaped alpha particle source 22 such as americium or polonium.

As will be discussed, alpha particle source 22 is translationally positioned from a non-interacting state in which alpha target material sleeve 20 does not interface alpha particle source 22, shown in FIG. 1, to an active, interacting state in which alpha target material sleeve 20 at least partially encases alpha particle source 22, shown in FIG. 2. In the interacting state, high energy neutrons are generated.

Sensor 10 also includes a gamma ray detector section 24. Detector section 24 is disposed within casing 16 and contains elements used to detect gamma radiation caused by the sensor's high energy neutrons interacting with a medium surrounding the sensor. As stated, these high energy neutrons are provided when rod-shaped alpha particle source 22 is positioned to be at least partially encased by alpha target material sleeve 20, shown in FIG. 2. The mechanism for providing the translational positioning of target material 20 and source material 22 will be discussed.

As can be seen in FIG. 1, gamma ray detector section 24 may be comprised of several elements. For example, section 24 may include a scintillation crystal 26 such as a sodium iodide scintillation crystal to detect gamma radiation caused by the sensor's high energy neutrons interacting with soil surrounding the sensor when it is in place. Gamma ray detection section 24 may also include a photomultiplier tube 28 operably coupled to scintillation crystal 26 to amplify detection signals produced by the crystal. Also a part of detector section 24 may be a converter 30 coupled to photomultiplier tube 28 for converting the tube's amplified detection signals into electrical signals for transmission to surface personnel by way of electrical cable 32. Gamma ray detection section 24 is commercially available as a unit, incorporating scintillation crystal 26, photomultiplier tube 28 and converter 30, by EG&G, Ortec.

Between detector section 24 and alpha source material 22 is a neutron radiation shield 34 to prevent fast , i.e. high energy neutrons from activated source 22 from reaching detector section 24. A shielding material with high hydrogen content, such as paraffin, may be used for this purpose. Surrounding at least a portion of gamma ray detection section 24, in this case scintillation crystal 26, is a neutron shield 36 used to prevent scattered (thermalized) neutrons from being detected by crystal 26. Such a shield may be constructed of cadmium, for example.

Referring now to FIGS. 1, 2 and 3, the details of how sensor 10 is switched to and from an active neutron generating state will be described. In FIGS. 1 and 2 there is shown an electrically actuated solenoid 38. Preferably, a direct current (DC) solenoid is used to minimize noise signals that otherwise might be detected by detector section 24.

Solenoid 38 is mounted to titanium casing 16 by way of solenoid support bracket 40 that is conventionally mounted to spring cup 42. Spring cup 42 may be made of metal and may be attached to titanium pipe section 16 by a conventional technique such as welding or bonding, e.g. brazing, gluing. Also attached to spring cup 42 is a retention spring 44 that is coupled to cup 42 by a conventional attachment technique such as bonding or welding. Push type solenoid 38 serves to translationally position movable assembly 46 from the non-interacting state shown in FIG. 1 to the interacting state shown in FIG. 2, the latter state causing the production of high energy neutrons.

As can be seen, retention spring 44 is connected to a bridge beam 48 that serves to transmit the pushing force of solenoid 38 to other sensor elements. Bridge beam 48, shown in detail in FIG. 3, is attached to retention spring 44 by conventional means such as bonding or welding. Surrounding photomultiplier tube 28 and converter 30 is a strength member 50 that transmits the translational forces made upon movable assembly 46 as well as functions as a magnetic shield to shield photomultiplier tube 28 and converter 30 from noise produced by solenoid 38. Such a shield could be constructed of the material under the trade name of MU-METAL with the shield being bonded to bridge beam 48. Alternatively, bridge beam 48 and shield 50 could be constructed as a single component. As shown, shield 50 has aperture 52 through which electrical cable 32 passes. Electrical cable 32 should be a shielded, coaxial cable to prevent the cable from picking up spurious signals from electromagnetic solenoid 38.

As can be seen, strength member-shield 50 is attached to cadmium neutron shield 36. This attachment may be by any of those techniques available to those skilled in the art. To further aid in transmitting the translational forces created by solenoid 38, a strength member 54 surrounds paraffin neutron radiation shield 34. Strength member 54 should be made of a material sufficiently strong to withstand the translational forces involved and can be coupled to cadmium shield 36 by conventional attachment means. Completing movable assembly 46 is the alpha particle source 22 that is fixedly attached to strength member 54 by a conventional means.

Referring now to FIG. 2 energization of solenoid 38 causes push rod 56 to extend to thereby urge movable assembly 46 into an interacting position. In this position alpha particle source 22 becomes at least partially encased by alpha target material sleeve 20.

The interfacing alpha particle and target materials emit high energy (fast) neutrons into the soil surrounding sensor 10. These neutrons will interact primarily with any hydrogen or chlorine present in the soil. The interactions will produce characteristic gamma radiation that will be subsequently detected and measured in gamma ray detector section 24. The data acquired may then be cabled to the surface by way of electrical cable 32 so that measurements may be made in real-time. The hydrogen-chlorine ratio of the surrounding material may be determined by measuring the ratio counts in two energy 18 windows. For hydrogen this window is 1–2 Mev and for chlorine the window lies between 3–8 Mev. These measurements will allow the quantification of chlorinated hydrocarbons within the vicinity of the sensor.

When an operator desires to cease fast neutron generation, he de-energizes or switches off solenoid 38 through its de-energization leads 58. Such a de-energization will cause retention spring 44, shown extended in FIG. 2, to retract movable assembly 46 into a non-interacting state in which alpha target material sleeve 20 does not interface alpha particle source 22. This non-interacting state is shown in FIG. 1.

The sensor of the invention allows continuous and real-time detection, quantification and mapping of the hydrogen/chlorine ratio from the earth's surface to a depth of approximately 150 feet in the matter of an hour or so. No expensive drilling is needed and the hole made by the penetrometer will back-fill itself, minimizing the emission of toxins from the sensor site.

Those skilled in the art will realize that an embodiment of the invention in which an alpha particle source is held stationary and an alpha target material is moved to an interacting position is also possible. As an additional embodiment, an enlarged version of the invention could be designed to suitably fit within the dimensions of a conventional drilling rod.

Obviously, many modifications and variations of the present invention are possible in the light of the above teachings. It is therefore to be understood that within the scope of the appended claims, the invention may be practiced otherwise than as has been specifically described.

What is claimed is:

1. An apparatus comprising:
   a casing;
   an alpha target material disposed within said casing;
   an alpha particle source attached to said casing;
   means for translationally positioning said alpha particle source and said alpha target material into an interacting state in which said alpha target material at least partially interfaces said alpha particle source to thereby cause the emission of high energy neutrons and for translationally positioning said alpha particle source and said alpha target material into a non-interacting state in which said alpha target material does not interface said alpha particle source;
   a gamma ray detector disposed within said casing for detecting gamma radiation caused by said high energy neutrons interacting with a medium surrounding said apparatus, said gamma ray detector generating a signal upon detecting said gamma radiation;
   a first neutron radiation shield disposed within said casing between said alpha particle source and said gamma ray detector for preventing said high energy neutrons from reaching said gamma ray detector; and
   a second neutron radiation shield disposed between said casing and said gamma ray detector for preventing scattered, thermalized neutrons from being detected by said gamma ray detector.

2. An apparatus according to claim 1 in which said alpha target material is shaped as a cylindrical sleeve and in which said alpha particle source is rod shaped.

3. An apparatus according to claim 2 in which said alpha particle source includes americium and in which said alpha target material includes beryllium.

4. An apparatus according to claim 1 in which said means for translationally positioning includes an electrically operated solenoid.

5. An apparatus according to claim 1 in which said signal of said gamma ray detector is an electrical signal and in which said gamma ray detector includes:
   a scintillation crystal for generating a detection signal upon detecting said gamma radiation;

a photomultiplier tube operably coupled to said scintillation crystal for amplifying said detection signal to produce an amplified detection signal; and a converter operably coupled to said photomultiplier tube for converting said amplified detection signal into said electrical signal.

6. An apparatus according to claim 5 in which said scintillation crystal is a sodium iodide scintillation crystal.

7. An apparatus according to claim 1 in which said first neutron radiation shield includes paraffin.

8. An apparatus according to claim 1 in which said second neutron radiation shield includes cadmium.

9. An apparatus comprising:

a tubular casing;

a cylindrical sleeve of alpha target material disposed within said tubular casing;

a rod shaped alpha particle source disposed within said tubular casing, said rod shaped particle source being movable between a non-interacting state and an interacting state in which said cylindrical sleeve at least partially encases said alpha particle source to cause the emission of high energy neutrons;

means for translationally moving said rod shaped alpha particle source between said non-interacting state and said interacting state;

a scintillation crystal disposed within said tubular casing for detecting gamma radiation caused by said high energy neutrons interacting with a medium surrounding said apparatus, said scintillation crystal generating a detection signal upon detecting said gamma radiation;

a photomultiplier tube operably coupled to said scintillation crystal for amplifying said detection signal to produce an amplified detection signal;

a converter operably coupled to said photomultiplier tube for convening said amplified detection signal into an electrical signal;

a first neutron radiation shield disposed within said tubular casing between said alpha particle source and said scintillation crystal for preventing said high energy neutrons from reaching said scintillation crystal; and a second neutron radiation shield disposed between said tubular casing and said scintillation crystal for preventing scattered, thermalized neutrons from being detected by said scintillation crystal.

10. An apparatus according to claim 9 in which said tubular casing includes titanium.

11. An apparatus according to claim 9 in which said rod shaped alpha particle source includes americium and in which said cylindrical sleeve includes beryllium.

12. An apparatus according to claim 9 in which said means for translationally moving said cylindrical sleeve includes an electrically operated solenoid.

13. An apparatus according to claim 9 in which said scintillation crystal is a sodium iodide scintillation crystal.

14. An apparatus according to claim 9 in which said first neutron radiation shield includes paraffin.

15. An apparatus according to claim 9 in which said second neutron radiation shield includes cadmium.

16. An apparatus comprising:

a titanium tubular casing;

a cylindrical beryllium sleeve fixed within said tubular casing;

an americium rod disposed within said tubular casing, said americium rod being movable between a non-interacting state and an interacting state in which said cylindrical beryllium sleeve at least partially encases said americium rod to cause the emission of high energy neutrons;

an electromagnetically actuated solenoid for translationally moving said americium rod with respect to said cylindrical beryllium sleeve between said non-interacting state and said interacting state;

a sodium iodide scintillation crystal disposed within said titanium tubular casing for detecting gamma radiation caused by said high energy neutrons interacting with a medium surrounding said apparatus, said sodium iodide scintillation crystal generating a detection signal upon detecting said gamma radiation;

a photomultiplier tube operably coupled to said scintillation crystal for amplifying said detection signal to produce an amplified detection signal;

a converter operably coupled to said photomultiplier tube for convening said amplified detection signal into an electrical signal;

a paraffin neutron radiation shield disposed within said tubular casing between said alpha particle source and said scintillation crystal for preventing said high energy neutrons from reaching said scintillation crystal; and a cylindrical cadmium shield disposed between said tubular casing and said scintillation crystal for preventing scattered, thermalized neutrons from being detected by said scintillation crystal.

17. An apparatus of claim 16 in which said apparatus is a part of a cone penetrometer.

* * * * *